United States Patent
Morita et al.

(10) Patent No.: US 7,133,085 B2
(45) Date of Patent: Nov. 7, 2006

(54) DISPLAY CONTROL APPARATUS, DISPLAY CONTROL METHOD AND INFORMATION RECORDING MEDIUM

(75) Inventors: Kenji Morita, Kawagoe (JP); Hitoshi Sato, Kawagoe (JP); Toshiyuki Murata, Kawagoe (JP); Yukari Mizumura, Kawagoe (JP); Rie Yamashita, Kawagoe (JP)

(73) Assignee: Pioneer Corporation, Tokyo-To (JP)

( * ) Notice: Subject to any disclaimer, the term of this patent is extended or adjusted under 35 U.S.C. 154(b) by 576 days.

(21) Appl. No.: 09/924,055

(22) Filed: Aug. 8, 2001

(65) Prior Publication Data

US 2002/0051098 A1    May 2, 2002

(30) Foreign Application Priority Data

Aug. 10, 2000    (JP) .................... P2000-242296

(51) Int. Cl.
*H04N 5/74*    (2006.01)
(52) U.S. Cl. .................................... 348/836
(58) Field of Classification Search ............. 348/836, 348/837, 789, 785, 786–9; 345/87
See application file for complete search history.

(56) References Cited

U.S. PATENT DOCUMENTS

| | | | | |
|---|---|---|---|---|
| 5,161,028 A | * | 11/1992 | Kawata et al. | 348/837 |
| 5,519,410 A | * | 5/1996 | Smalanskas et al. | 345/7 |
| 5,555,466 A | * | 9/1996 | Scribner et al. | 725/75 |
| 5,742,358 A | * | 4/1998 | Iijima et al. | 348/789 |
| 5,811,791 A | | 9/1998 | Portman | 250/221 |
| 5,847,685 A | * | 12/1998 | Otsuki | 345/87 |
| 5,949,345 A | * | 9/1999 | Beckert et al. | 340/815.41 |
| 5,996,954 A | * | 12/1999 | Rosen et al. | 248/278.1 |
| 6,049,288 A | * | 4/2000 | Kawasaki | 340/815.4 |
| 6,115,086 A | * | 9/2000 | Rosen | 348/837 |
| 6,124,902 A | * | 9/2000 | Rosen | 348/837 |
| 6,125,030 A | * | 9/2000 | Mola et al. | 361/681 |
| 6,130,727 A | * | 10/2000 | Toyozumi | 348/837 |
| 6,157,418 A | * | 12/2000 | Rosen | 348/837 |
| 6,179,263 B1 | * | 1/2001 | Rosen et al. | 248/278.1 |
| 6,409,242 B1 | * | 6/2002 | Chang | 296/37.7 |
| 6,443,574 B1 | * | 9/2002 | Howell et al. | 353/13 |
| 6,494,527 B1 | * | 12/2002 | Bischoff | 296/208 |
| 6,633,658 B1 | * | 10/2003 | Dabney et al. | 382/128 |

(Continued)

FOREIGN PATENT DOCUMENTS

JP    02031577    2/1990

(Continued)

Primary Examiner—Paulos M. Natnael
(74) Attorney, Agent, or Firm—Drinker Biddle & Reath LLP (57) ABSTRACT

A display control apparatus has a display panel, which is placed in its inactive state through a user's operation when not being used, on the one hand, and is placed in is active state when being used, on the other hand. After completing the display of video, the display panel is received automatically, thus ensuring protection of the display panel. It also prevents a beginning part of video from being hidden for a user. All video can be displayed on the display panel that stands up in its prescribed active state. In the display control apparatus, a rotary motor driver and a slider motor driver are used for placing the display panel received in a receiver. An encoder detects whether or not the display panel is placed in its prescribed active state. When the active state of the display panel is detected, an output controller outputs a video signal to the display panel for display.

9 Claims, 9 Drawing Sheets

U.S. PATENT DOCUMENTS

| | | | |
|---|---|---|---|
| 6,678,892 B1 * | 1/2004 | Lavelle et al. | 725/75 |
| 6,778,381 B1 * | 8/2004 | Bolognia et al. | 361/681 |
| 6,816,129 B1 * | 11/2004 | Zimmerman | 345/1.1 |

FOREIGN PATENT DOCUMENTS

| | | |
|---|---|---|
| WO | WO 97/46422 | 12/1997 |
| WO | WO 98/30018 | 7/1998 |

* cited by examiner

DISPLAY CONTROL APPARATUS, DISPLAY CONTROL METHOD AND INFORMATION RECORDING MEDIUM

BACKGROUND OF THE INVENTION

The present invention relates to a display control apparatus, display control method, and an information recording medium. Particularly, the present invention relates to a display control apparatus and display control method, which control the display of video on a display panel that is placed in its inactive state when not displaying video, on the one hand, and is placed in its active state when displaying video, and to an information recording medium in which a program for the display control is recorded.

Recently, a variety of audio devices mounted on vehicles have been commercially available, and the need of displaying video on vehicles has also increased. Such video includes images of television broadcasting, information recorded in an optical disc (for instance, images like map information recorded in a CD-ROM (Compact Disc-Read Only Memory) or DVD-ROM used as part of a navigation system), and movie information recorded in a recording medium such as a read-only DVD.

In order to meet such need, various kinds of on-vehicle video display apparatus have been developed. Of these, there is provided a video display apparatus in which a display panel (a video displaying unit) is retracted in a dash board when not displaying video, and is placed in a certain video-visible position from the dashboard only when displaying video. This allows the limited space of a vehicle to be used effectively and prevents the display panel from deforming due to solar heat or others, thus protecting the display panel from being deteriorated in performance. Generally, this type of video display apparatus is called an "in-dash monitor".

The in-dash monitor has, for example, such a construction that its display panel starts to move from its in inactive state, i.e., its received or retracted state to its active state, i.e., its extended state in response to the turn on of the vehicle ignition switch. Normally, it needs about 3 to 5 seconds to move the display panel from the inactive state to the active state.

By contrast, when the display panel currently placed in its active state is moved to its retracted state, the movement of the display panel is started in response to the turn off of the vehicle ignition switch.

However, in the conventional in-dash monitor, displaying video on the display panel is started simultaneously with the start to its active state. Thus, during a period of time of about 3 to 5 seconds in the beginning of displaying the video, the video will be displayed in the state that a user is unable to look it clearly. This leads to a problem that a certain period from the beginning of the video is always blind for a user.

As for retracting the conventional display panel from its active state, the display panel is moved to its retracted state responsively to the turn off of the ignition key. Consequently, even when the display of video recorded in an optical disc came to an end, the display panel is kept extended, unless the ignition key is turned off. This causes another problem that the above-mentioned performance protection to the display panel is not fully attained.

SUMMARY OF THE INVENTION

The present invention has been made to overcome the foregoing various inconveniences. An object of the present invention is to provide a display control apparatus, a display control method, and an information recording medium in which a display control program is recorded, which are able to ensure performance protection of the display panel by placing the display panel in its inactive state when the display of video comes to an end, without depending on operations of a user, and make it possible to display all video on the display panel placed in its active state by preventing a beginning part of the displayed video from being out of view, the display panel being retractable in response to a user's operation when not displaying video and being placed in its active state when displaying video. In the present invention, the "active state" means that the display panel is kept visible, and the "inactive state" means that the display panel is kept invisible.

On entering an active state of the display device, the display of video is started by the display device. It is therefore possible to provide all of video to be displayed, through the display device that has already been placed in its active or extended state.

Therefore, for using the display device, which is retracted when video is not displayed and is extended when video is displayed, it is prevented that the beginning of video to be displayed is skipped from its display. The video that is subject to display is entirely displayed by the active display device without fail.

In cases where the completion of display of all pieces of video is detected, receiving the display device, which is now in its active state, is started. Hence, the display device can be retracted without operator's manual operations, ensuring higher performance in protection of the display panel.

Like the foregoing, for using the display device, which is retracted when video is not displayed and is extended when video is displayed, all pieces of video that are subject to display can be displayed by the display device without fail.

Accordingly, video can be avoided from being displayed in an improper visible condition.

On entering an active state of the display device, the display of video is started by the display device. It is therefore possible that video that is intended is displayed from the beginning by the display device that has already been extended.

Therefore, for using the display device, which is retracted when video is not displayed and is extended when video is displayed, it is prevented that the beginning of video to be displayed is skipped from its display. The video that is subject to display is entirely displayed by the extended display device without fail.

In cases where the completion of display of all pieces of video is detected, receiving the display device, which is now in its active state, is started. Hence, the display device can be received without operator's manual operations, ensuring higher performance in protection of the display panel.

Like the foregoing, for using the display device, which is retracted when video is not displayed and is extended when video is displayed, all pieces of video that are subject to display can be displayed by the display device without fail.

Accordingly, video can be avoided from being displayed in an improper visible condition.

The computer is made to function such that, on entering an active state of the display device, the display of video is started by the display device. It is therefore possible that video that is intended is displayed from the beginning by the display device that has already been extended or unfolded.

Therefore, for using the display device, which is retracted when video is not displayed and is extended when video is displayed, it is prevented that the beginning of video to be displayed is skipped from its display. The video that is subject to display is entirely displayed by the unfolded display device without fail.

The computer functions so that, when the completion of display of all pieces of video is detected, receiving the display device now in its active state is started. Hence, the display device can be retracted without operator's manual operations, ensuring higher performance in protection of the display panel.

Like the foregoing, for using the display device, which is retracted when video is not displayed and is extended when video is displayed, all pieces of video that are subject to display can be displayed by the display device without fail.

Accordingly, video can be avoided from being displayed in an improper visible condition.

DETAILED DESCRIPTION OF THE PREFERRED EMBODIMENT

Referring to the accompanying drawings, a preferred embodiment of the present invention will now be described.

The embodiment, to which the present invention is applied, relates to a video displaying apparatus capable of displaying video obtained from an optical disc or broadcasting radio waves on an in-dash monitor mounted in an automobile.

(I) Embodiment

First, referring to FIGS. 1(a)–1(c) to 5, one embodiment according to the present embodiment will now be described.

Figure 1A:
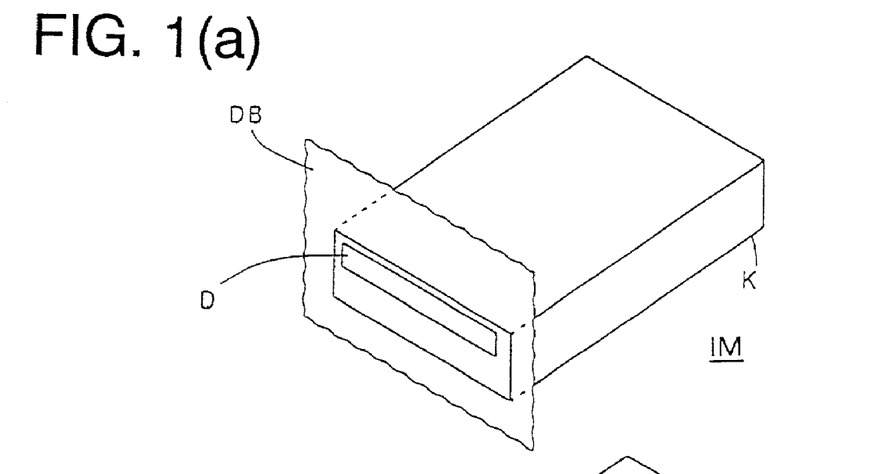
FIGS. 1(a) to 1(c) are external perspective views each showing the construction and operations of an in-dash monitor according to an embodiment of the present invention.
Figure 1B:
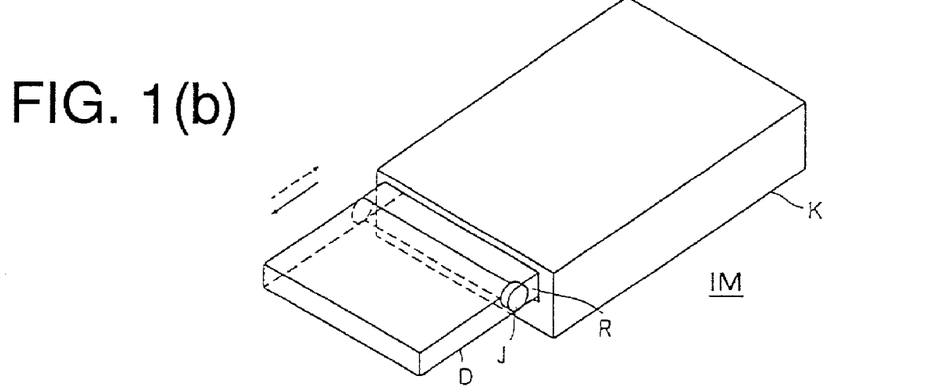
Figure 1C:
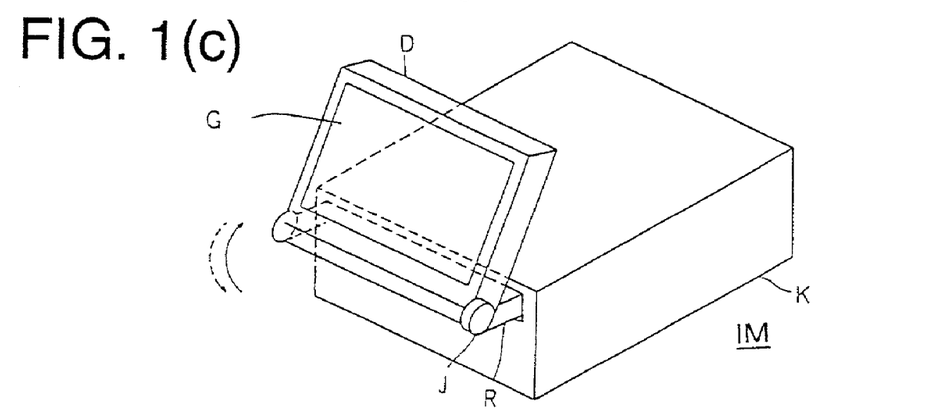
Figure 2:
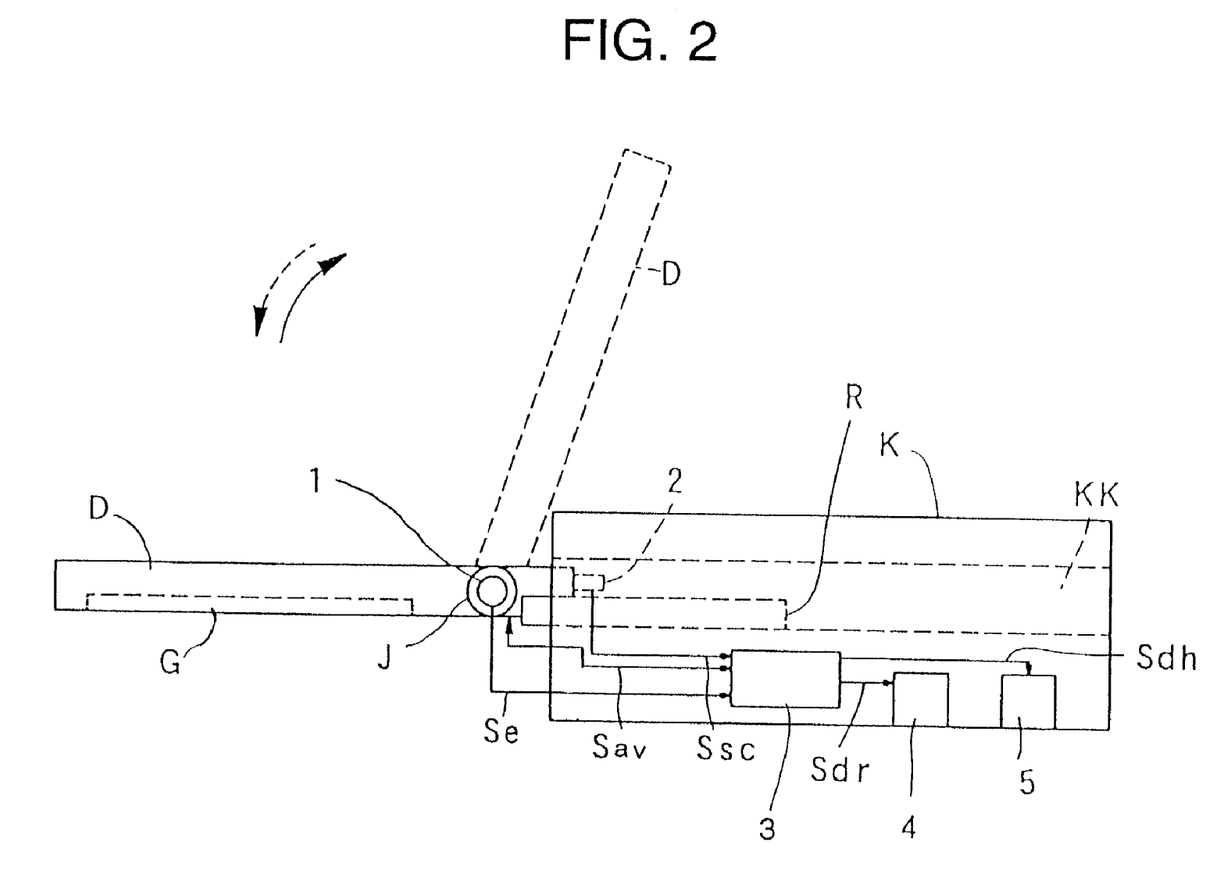
FIG. 2 is a side view showing the internal construction and operations of the in-dash monitor according to the embodiment of the present invention.
Figure 3:
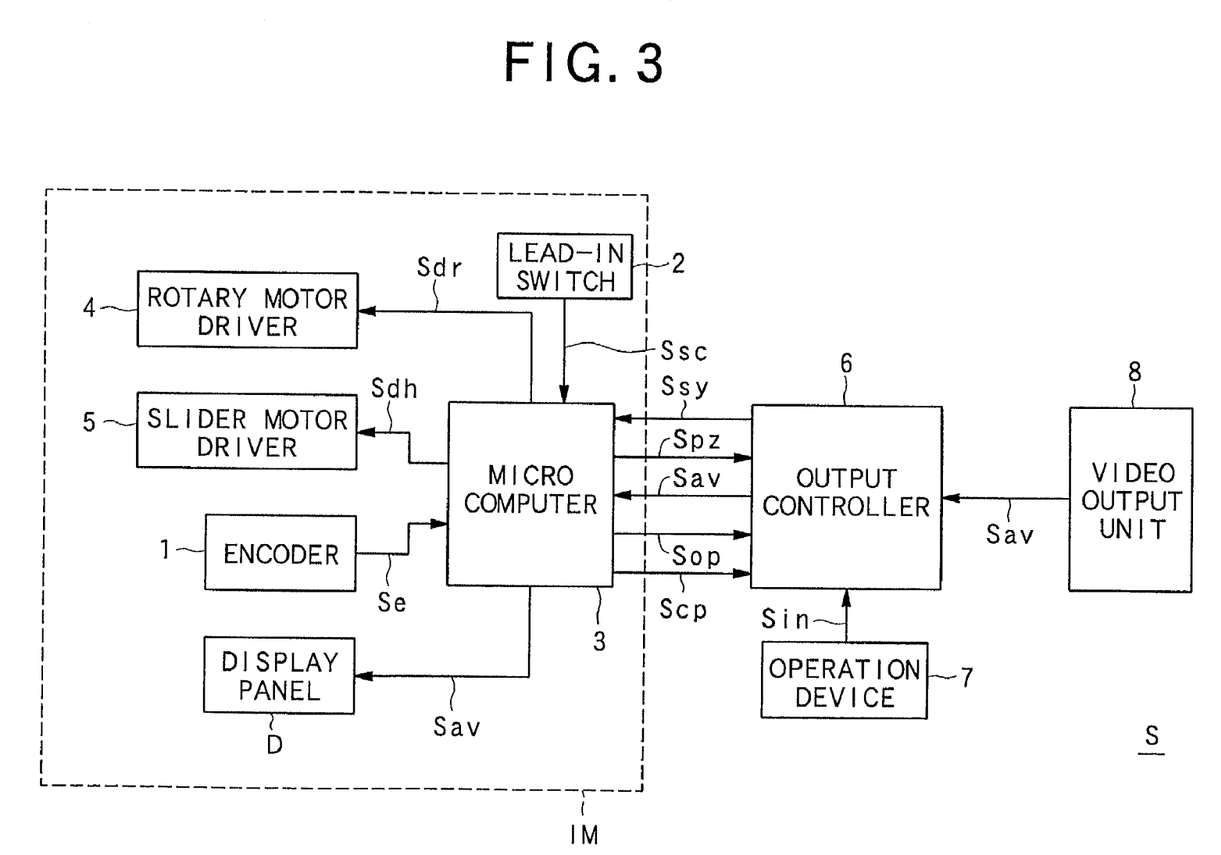
FIG. 3 shows a block diagram showing an outlined electric configuration of a video display apparatus according to the embodiment of the present invention.
Figure 4:
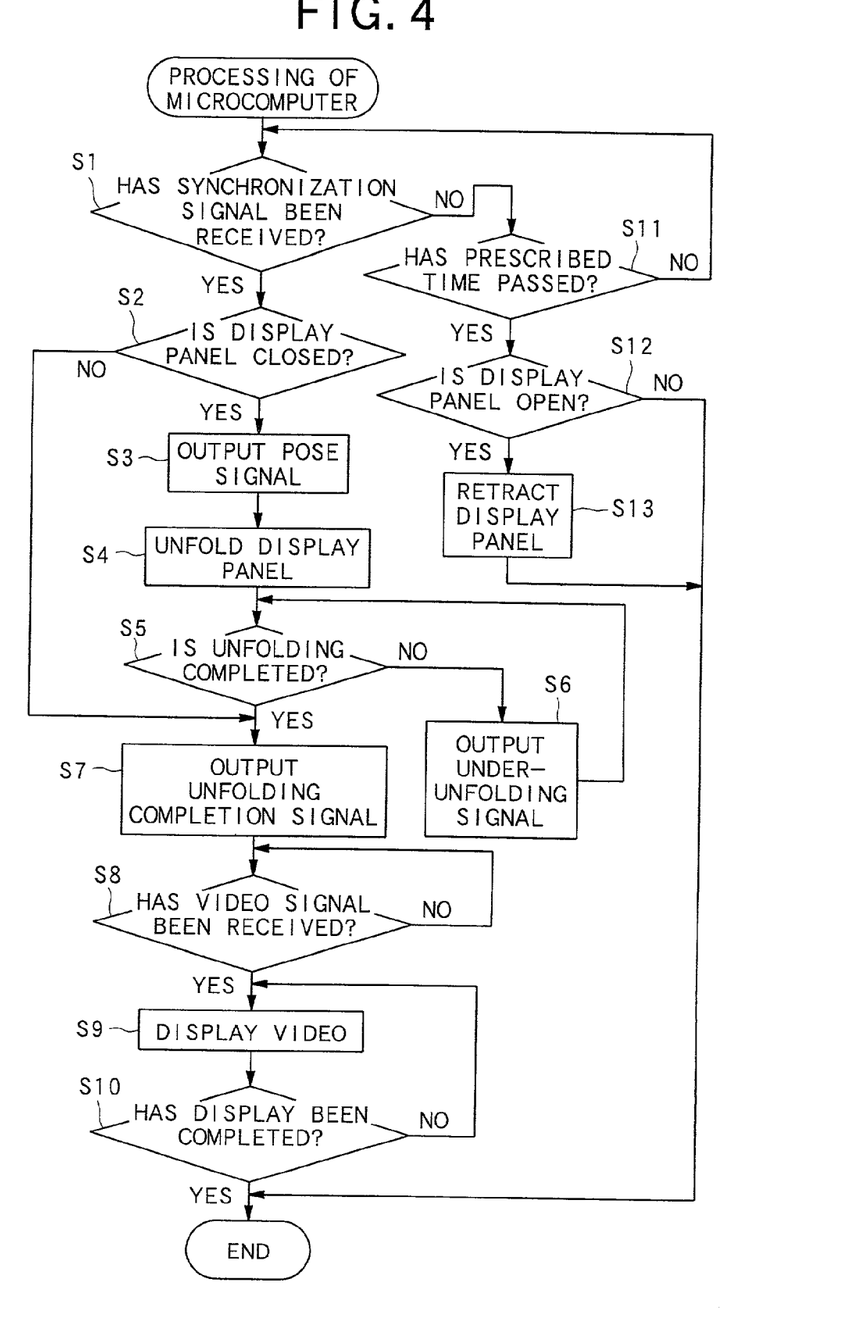
FIG. 4 is the first flowchart showing display control processing performed in the embodiment of the present invention.
Figure 5:
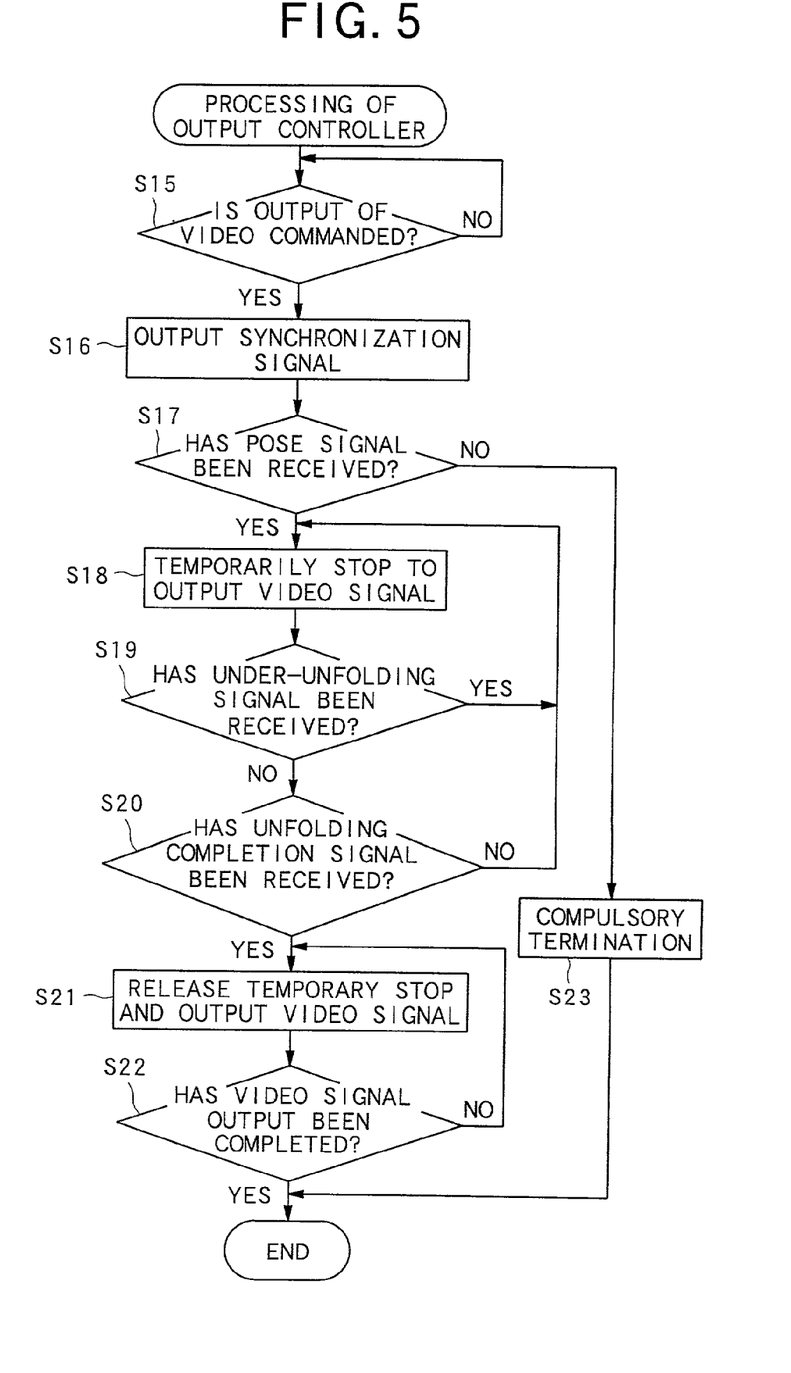
FIG. 5 is the second flowchart showing display control processing performed in the embodiment of the present invention.

FIGS. 1(a) to 1(c) are external perspective views showing the construction and operations of an in-dash monitor according to the embodiment. FIG. 2 is a side view showing the internal construction and operations of the in-dash monitor of the embodiment. Further, FIG. 3 shows a block diagram outlining the electric configuration of a video display apparatus according to the present invention, while FIGS. 4 and 5 show flowcharts of processing for display control performed by the video displaying apparatus.

At first, the external view and outlined operations of the in-dash monitor of the present embodiment will now be explained with reference to FIGS. 1(a) to 1(c).

As shown in FIGS. 1(a) to 1(c), the in-dash monitor IM of the present embodiment includes a display panel D serving as a display device and a receiver K serving as a receiving device. When the in-dash monitor IM is unused, the display panel D is received in the receiver K, as shown in FIG. 1(a).

The receiver K is mounted within a dashboard DB such that only the front thereof, including the front of the display panel D, is exposed to the interior space of the automobile.

To display video, it is required that the display panel D be extended or unfolded. In that case, as shown in FIG. 1(b), the display panel D and an axis J for rotating the display panel D are drawn forward from the receiver K with a drawing rail R sliding on a guide of the receiver (refer to a solid-line arrow in FIG. 1(b)).

After completely drawing the axis J and display panel D out of the receiver K, the display panel D is turned clockwise (in FIG. 1(c)) around the axis J, as illustrated by a solid-line arrow in FIG. 1(c). This action enables the display panel D to stand up, so that a display screen mounted on one side of the display panel D is located so as to face to a crew. Accordingly, a crew is allowed to have access to the display panel D.

In contrast, for receiving the display panel D after its use, opposite actions to the above actions will be done. First of all, the display panel D is turned counterclockwise in FIG. 1(c) to fall down to a prescribed position from which the display panel D can be pushed into the receiver K (refer to a dotted line in FIG. 1(c)). The fallen display panel D is slid on the drawing rail R, together with the axis J, to be received in the receiver K (refer to a dotted line in FIG. 1(b) and FIG. 1(a).

The foregoing actions can be performed by driving a motor for sliding the display panel D and axis J along the drawing rail R and a motor for rotating the display panel D about the axis J, both motors being described later.

The internal construction and others of the in-dash monitor, which executes the foregoing actions, will be explained in detail using FIG. 2.

As shown in FIG. 2, the in-dash monitor IM of the present embodiment comprises the foregoing display panel D, made up of a liquid crystal panel or others, having on its one side a display screen G for displaying desired images, and a receiver K having therein a receiving space KK in which the display panel D is received horizontally in FIG. 2 when the monitor is not used. The receiver K is mounted in the dashboard DB with its front opened outside, as shown in FIG. 1.

The display panel D is placed with the axis J in such a manner that the panel is rotatable about the axis J. When being unused, the display panel D is pulled into and received in the receiving space KK together with the axis J. By contrast, for using the display panel D, the panel is pulled out from the receiving space KK together with the axis J toward the left in FIG. 2, before it is rotated clockwise in FIG. 2 up to a stop position shown by a dotted line in FIG. 2, thus realizing a stand-up state of the panel at rest at the stop position.

After use, the display panel D is rotated counterclockwise in FIG. 2 from the dotted line position shown in FIG. 2 to a position, which is shown by a solid line in FIG. 2, allowing the panel to be ready for being received in the receiving space KK. The display panel is then pulled into the receiver K together with the axis J toward the right in FIG. 2, which completes the receiving of the panel. The solid-lined panel position in FIG. 2 functions as a position for allowing the display panel D to be thoroughly received in the receiving space KK (without collisions of the panel to the inner walls of the receiving space KK during travel of the panel in the receiving space). Hereinafter, the solid-lined panel position in FIG. 2 is referred to as a "receiving position."

Both of the display panel D and the axis J are moved together along the drawing rail R movable in the right and left direction in FIG. 2 so that they are pulled out of or inserted in the receiving space KK.

An encoder 1, which functions as a detection device, is coaxially attached to the axis J. The encoder 1 generates a position detecting signal Se indicative of voltage approximately proportional to a rotational angle of the display panel D and sends it to a microcomputer 3 described later.

On an end of the display panel D is secured a lead-in switch 2 that come into its on state responsively to a touch with the inner wall of the receiving space KK in cases the display panel D is completely inserted into the receiving space KK. The lead-in switch 2 generates a lead-in signal Ssc in response to its on state and sends it to the microcomputer 3.

In other portions other than the receiving space KK in the receiver K, there are secured a rotary motor driver 4 and a slider motor driver 5. The rotary motor driver 4, which serves as one element of opening device, drives a not-shown rotary motor for rotating the display panel D about the axis J. The slider motor driver 5, which also serves as another element of the opening device, drives a not-shown slider motor for moving the display panel D right and left in FIG. 2 together with the axis J. Each of the drivers 4 and 5 is controlled with each of control signals Sdr and Sdh supplied from the microcomputer 3, thereby driving a rotary motor and a slider motor, respectively.

The microcomputer 3, which serves as one element for a detection device and a receiving control device, realizes control with an output controller 6 described later and executes later-described processing by using both of the position detecting signal Se from the encoder 1 and the lead-in signal Ssc from the switch 2. As results of the control and processing, the microcomputer 3 controls exposing action, retracting action, and other actions of the display panel D as well as outputs a video signal Sav to the display panel D through later-described processing. Hence, video expressed by the video signal Sav can be visualized on a display screen G of the display panel D.

The exposure of the display panel D is defined by a series of actions of drawing the display D out of the receiver K together with the axis J, and then rotating the drawn display panel in the clockwise in FIG. 2 up to an angular position providing a video displayable state. The video displayable state is a state in which video on the display screen G is clearly visible for users. Meanwhile, the receiving of the display panel D is defined by a series of actions of rotating back the display panel D under the video displayable state down to an angular position for receiving in the counterclockwise in FIG. 2, and then inserting the panel in the receiver K completely.

Specifically, the video displayable state is realized in such a manner that, for example, a user previously operates an operation device so as to provide the microcomputer 3 with angular information which allows the display panel D to stand at a desired easy-to-see angle.

With reference to FIG. 3, the configuration and outlined operations of the video display apparatus according to the present embodiment will now be described, which includes the in-dash monitor IM constructed and operated as above.

A video display apparatus S including the foregoing in-dash monitor IM comprises (i) an output controller 6 functioning as an output device, (ii) an operation device 7 and (iii) a video output unit 8.

The operation of the video display apparatus will now be outlined.

First, the video output unit 8 produces the video signal Sav of video to be displayed on the display panel D, and sends it to the output controller 6.

In cases video recorded on an optical disc is displayed, an information replay apparatus serves as the video output unit 8, in which the recorded information is detected from the optical disc to replay it as video. Further, for displaying on the display panel D video received through a radio wave of television broadcasting, the video output unit 8 is realized by a television receiver to receive the broadcasting radio wave.

The output controller 6 controls the microcomputer 3 of the in-dash monitor IM based on an operation signal Sin supplied responsively to an operation performed with the operation device 7. This makes the display panel D display necessary video thereon.

In this control, the output controller 6 provides the microcomputer 3 with the video signal Sav that has been sent from the video output unit 8 and a synchronization signal Ssy for the video signal Sav. The synchronization signal Ssy, which composes part of the video signal Sav, is given to the microcomputer 3 prior to transmitting video expressed by the video signal Sav to the microcomputer 3.

In parallel with this, the output controller 6 executes display control processing shown in FIG. 5 on the basis of a pose signal Spz, an exposure completion signal Sop, and an under-exposure signal Scp, which will be described later, all of which are supplied from the microcomputer 3.

In the display control of video, the microcomputer 3 performs later-described processing based on the position detecting signal Se, with the result that the pose signal Spz, the exposure completion signal Sop, and the under-exposure signal Scp are produced to be sent to the output controller 6.

The pose signal Spz is a signal for temporarily causing the output controller 6 to stop outputting the video signal Sav. The exposure completion signal Sop shows that the exposure of the display panel D to the video displayable state has been completed. The under-exposure signal Scp shows that the display panel D is now under development to the video displayable state.

Concurrently, based on the synchronization signal Ssy and video signal Sav, which are from the output controller 6, the microcomputer 3 execute display control processing shown in FIG. 4. In such execution, the foregoing control signals Sdr and Sdh are sent to the rotary motor driver 4 and slider motor driver 5, respectively, and the video signal Sav is sent to the display panel D.

The display control processing according to the present embodiment executed mainly by both microcomputer 3 and output controller 6 will now be described in conjunction with flowcharts shown in FIGS. 4 and 5.

At first, referring to FIG. 4, a display control processing executed by the microcomputer 3 will now be explained.

By the microcomputer 3, it is first determined whether or not the synchronization signal Ssy, which precedes the video signal Sav, has been received (Step S1).

When it is determined that the synchronization signal Ssy has been received (YES at Step S1), the processing transfers to a step to display on the display panel D video corresponding to the video signal Sav which should be received next. It is then determined if the display panel D is now extended or unfolded in the video displayable state or received in the receiver K, based on the lead-in signal Ssc and position detecting signal Se (Step S2).

If the display panel D is extended up to a position for the video displayable state (NO at Step S2), it is recognized that the video can be displayed at once, thus being moved to processing at Step S7. In contrast, when the display panel D has yet to be extended up to a position for the video displayable position (YES at Step S2), the microcomputer 3 produces the pose signal Spz to output it to the output controller 6 (Step S3), thus realizing a temporal stop of output of the video signal Sav. The microcomputer 3 also produces the foregoing control signals Sdh and Sdr and then outputs their control signals to the slider motor driver 5 and the rotary motor driver 4, respectively (Step S4), pulling out the display panel D from the receiver and placing it up to the position for the video displayable state.

When the exposure of the display panel D starts, it is determined based on the position detecting signal Se whether or not the display panel D has been placed in the position for the video displayable state (Step S5). If the exposure is not completed (NO at Step S5), the under-exposure signal Scp is outputted to the output controller 6 to continue the exposure processing (Step S6).

However, when it is detected at the determination of Step S5 that the exposure of the display panel D has been completed (YES at Step S5), the exposure completion signal Sop is produced and sent to the output controller 6 (Step S7).

Practically, at a timing when the position detecting signal Se is detected, which shows that the display panel D has turned by a prescribed angle for the video displayable state, it is determined that the exposure of the display panel D has been completed.

It is then determined whether or not a video signal Sav including video information to be displayed has been received from the output controller 6 (Step S8). If the video signal Sav has not been received (NO at Step S8), the processing to monitor the reception is repeated. In contrast, the video signal Sav has been received (YES at Step 8), the video is displayed on the display panel D that has already been in the video displayable state (Step S9).

After this, the determination that the display has been completed is made for all pieces of video (Step S10). When the display has not been completed for all pieces of video (NO at Step S10), the display processing for other pieces of video is continued, while when the display has been completed (YES at Step S10), the display control processing is finished for all the pieces of video. After this display, the display panel D will be received in the receiver K.

Meanwhile, it is determined at Step S1 that the synchronization signal Ssy has not been received (NO at Step S1), it is recognized that video to be displayed has not been obtained. Then, it is determined if or not a specified period of time has passed with no reception of the synchronization signal Ssy (Step S11). The processing at Step S11 determines if the synchronization signal Ssy has not been received yet or not, that is, video to be displayed has not been received yet or not.

Practically, such occasions with no video include a state in which video to be displayed is not received before its display start timing has not come and another state in which the synchronization signal Ssy is not received because the display of all pieces of video to be displayed has been completed.

In cases it is determined at step S11 that the specified period of time has not passed (NO at Step S11), waiting for the synchronization signal Ssy is done until the specified period of time passes. On the other hand, when the specified period of time has passed (YES at Step S11), it is determined on the basis of the position detecting signal Se whether or not the display panel D is currently in the video displayable state (Step S12).

When the display panel D is not in the video displayable state (NO at Step S12), the display control processing is terminated without any actions. In contrast, when the display panel D is in the video displayable state (YES at Step S12), the display panel D currently in the video displayable state is forced to be received in the receiver K (Step S13), before the display control processing is terminated.

Referring to FIG. 5, processing executed by the output controller 6, which constitutes part of the display control processing according to the present embodiment, will now be described.

At first, the output controller 6 determines if or not an operation signal Sin has been received from the operation device 7 (Step S15), the signal indicating that video should be read from the video output unit 8 to display it on the display panel D. When such operation signal Sin has not been inputted (NO at Step S15), waiting is kept until the input of the operation signal. But, when the operation signal has been inputted (YES at Step S15), the synchronization signal Ssy included in the video signal Sav provided from the video output unit 8 is sent to the microcomputer 3 prior to the video itself (Step S16: refer to Step S1 in FIG. 4).

It is then determined whether or not the pose signal Spz has been received from the microcomputer 3 (Step S17). In the case that the pose signal has not been received (NO at Step S17), waiting is kept during a specified period of time without any processing. When the pose signal Spz has not been received from the microcomputer 3 after the specified period of time, the display control processing is obliged to be terminated (Step S23), because it is considered that there occurs a malfunction in exposing the display monitor D.

On the other hand, when it is determine that the pose signal Spz has been received (YES at Step S17), it is recognized that the display panel D has not been ready for its video displayable state in the in-dash monitor IM yet. Thus, the output of the video signal (video information) Sav to the microcomputer 3, which follows the synchronization signal Ssy, is halted temporarily (Step S18). It is then determined whether or not the under-exposure signal Scp (refer to Step S6 in FIG. 4) has been received (Step S19).

When the reception of the under-exposure signal Scp is determined at Step 19 (YES at Step S19), it is recognized that the display panel D has been yet to be extended or unfolded up to its video displayable state in the in-dash monitor IM, thereby its temporarily halted state is maintained (Step S18). On the other hand, when the under-exposure signal Scp has not been received yet (NO at Step S19), it is then determined if the exposure completion signal Sop (refer to Step S7 in FIG. 4) has been received or not (Step S20).

If the exposure completion signal Sop has not been received yet (NO at Step S20), it is recognized that the display panel D has been yet to be extended up to its video displayable state in the in-dash monitor IM, thereby its temporarily halted state is maintained (Step S18). In contrast, when the exposure completion signal Sop has been received (YES at Step S20), it is recognized that the exposure of the display panel D in the in-dash monitor IM has been completed. The output of the video signal (video information) Sav, which has been temporarily halted at Step S18, is started to display the video on the display panel D (Step S21: refer to Steps S8 and S9 in FIG. 4).

It is then determined if the output of all pieces of video to the microcomputer 3 has been completed or not (Step S22). When such completion is not realized (NO at Step S22), the output of the video signal Sav for the remaining pieces of video is repeated (Step S21). In contrast, when being completed (YES at Step S22), the entire display control processing is terminated.

As described above, in the display control processing carried out by the video display apparatus S of the embodiment, the display of video is started only when the display panel D comes into its video displayable state (refer to Step S21 in FIG. 5). In other words, all pieces of video to be displayed can be displayed on the display panel D brought into its video displayable state in advance.

In cases the display panel D has been yet to be extended or unfolded up to the position for the video displayable state, the video signal Sav is prohibited from being outputted (temporarily halted) to the display panel D (refer to Step S18 in FIG. 5). This prohibition makes it possible to avoid video from being displayed in the course of exposing the display panel D.

When the display of all pieces of video has been completed, the display panel D is retracted from its video displayable state (Step S1 in FIG. 4). It is therefore possible to retract the display panel D without any user's manual operation.

Additionally, the position to which the display panel D is unfolded provides its video displayable state in which the video is clearly visible. This prevents video from being displayed with an improper visible state.

(II) Modifications

Figure 6A:
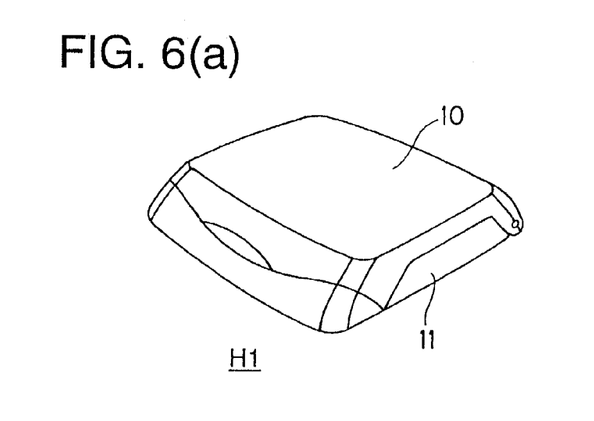
FIG. 6(a) is an external perspective view showing the inactive or folded state of a video display apparatus according to the first modification of the embodiment of the present invention.
Figure 6B:
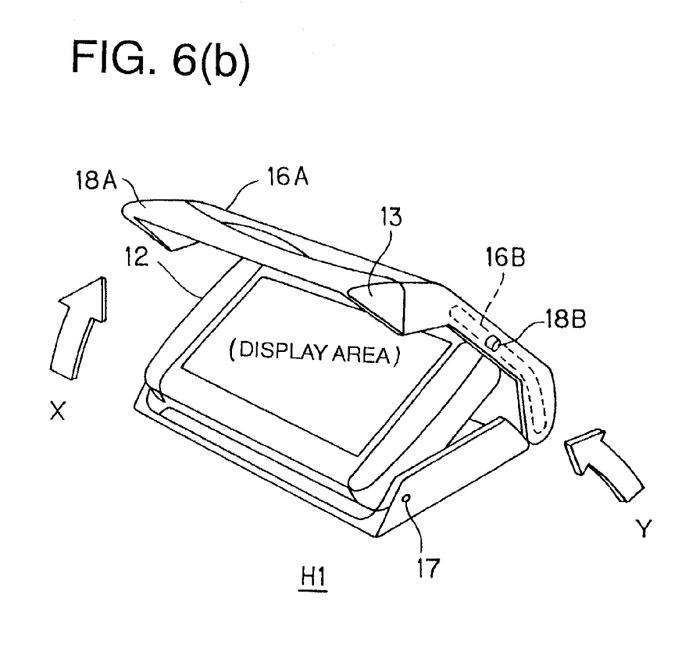
FIG. 6(b) shows an external perspective view showing an intermediate state in the course of opening a front cover of the video display apparatus and FIG. 6(c) shows an external perspective view showing the active or opened state of the front cover of the video display apparatus.
Figure 6C:
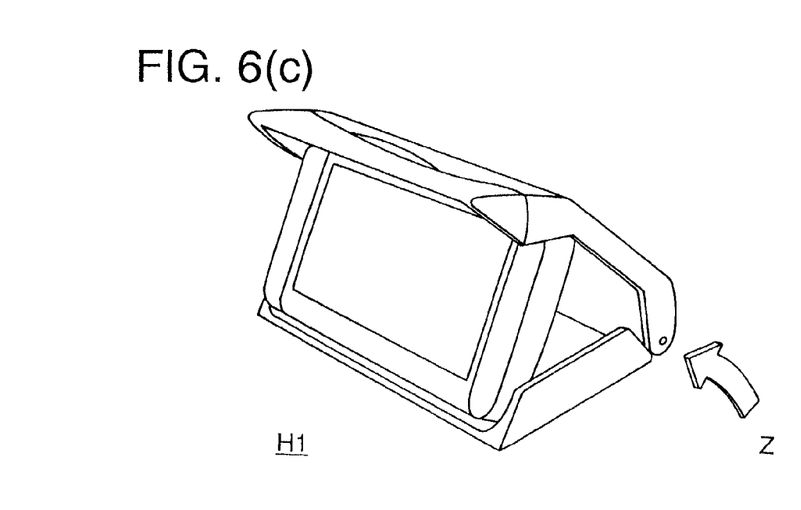

Referring to FIGS. 6(*a*)–6(*c*) to 9(*a*)–9(*b*), modifications of the present embodiment will now be described.

FIGS. 6(*a*)–6(*c*) to 9(*a*)–9(*b*) are external perspective views each showing a video display apparatus of each modification.

The foregoing embodiment has explained the video display control processing, which is executed in the in-dash monitor performing the operations as shown in FIG. 1, to which the present invention is applied. Moreover, the present invention is not limited to such a mode, but can be applied to various other modes of video display apparatus.

For example, as shown in FIGS. 6(*a*) to 6(*c*), there is provided a video display apparatus H1 according to the first modification. The video display apparatus H1 has a construction in which a front cover 10 is folded onto a base 11 with a liquid crystal monitor 12 received therebetween. A not-shown attachment to secure the base 11 on a dashboard or others is secured on the base 11.

Along both side walls of the front cover 10, guide grooves 16A and 16B are formed. Protrusions 18A and 18B secured on both upper corners of the liquid crystal monitor 12 come into engagement with the guide grooves 16A and 16B. A user grasps a holding end 13 or others of the front cover 10, and can open and close the front cover 10. In association with the open and close motions of the front cover 10, the protrusions 18A and 18B are smoothly slid along the guide grooves 16A and 16B about a pivot shaft (a hinge) 17.

In this video display apparatus H1, a not-shown stopping mechanism is secured closely to the pivot shaft 17, so that the liquid crystal monitor can be stopped at a prescribed angular position.

In the case that this video display apparatus H1 is opened by hand, the holding end 13 of the front cover 10 is grasped by fingertips and opened, as being pushed slightly, in a direction X in FIG. 6(*b*).

In association with a motion of the front cover 10, the liquid crystal 12 gradually stands up as it slides along the guide grooves 16A and 16B, as shown in directions Y and Z.

When the liquid crystal monitor 12 stands up to a prescribed angular position, a not-shown chuck device locks the monitor 12.

By contrast, for closing the front cover 10, the chuck device is released to fold the liquid crystal 12 between the front cover 10 and the base 11.

For applying the present invention to the video display apparatus H1 shown in FIGS. 6(*a*) to 6(*c*), the output of the signals are controlled as follows. That is, the pose signal Spz and under-exposure signal Scp are outputted from the microcomputer 3 during placing the liquid crystal monitor 12 in a position shown in FIG. 6(*c*). In addition, the exposure completion signal Sop is outputted to start the output of the video signal Sav, when the liquid crystal monitor 12 has been extended or unfolded up to a video displayable position.

In the video display apparatus H1 of the present modification, arranging electric motors or other necessary devices closely to the pivot shaft 17 enables the video display apparatus to be opened and closed with electric power. In this case, the determination whether or not the synchronization signal Ssy is received within a specified period of time is made. If the determination of no reception is made, i.e., the display of video is completed, the video display apparatus H1 currently under its opened state is closed.

Figure 7A:
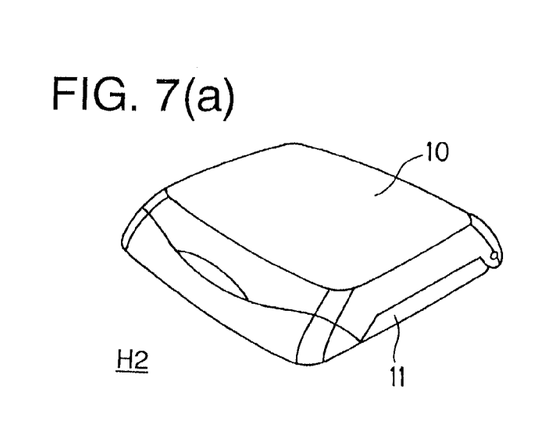
FIG. 7(a) is an external perspective view showing the inactive or folded state of a video display apparatus according to the second modification of the embodiment of the present invention.
Figure 7B:
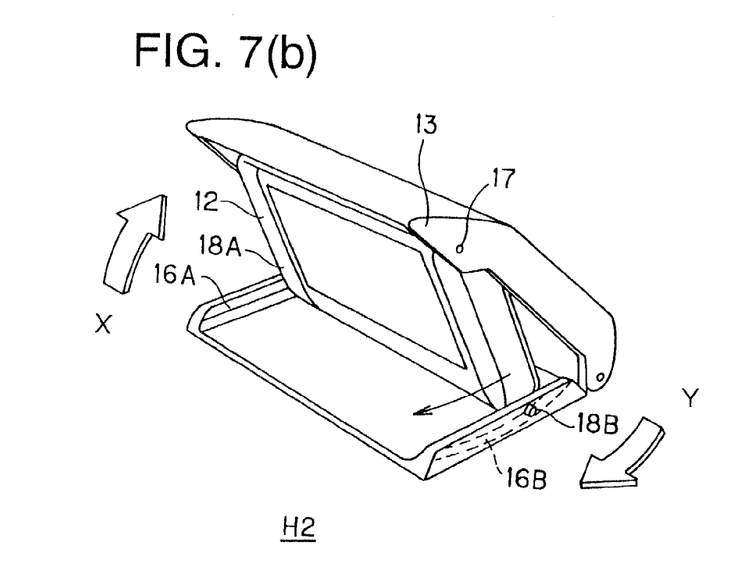
FIG. 7(b) shows an external perspective view showing an intermediate state in the course of opening a front cover of the video display apparatus and FIG. 7(c) shows an external perspective view showing the active or opened state of the front cover of the video display apparatus.
Figure 7C:
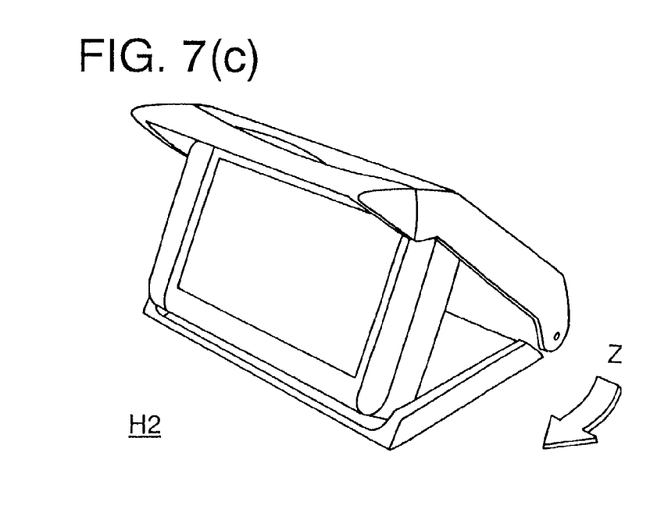

The second modification will now be described. As shown in FIGS. 7(*a*) to 7(*c*), there is provided a video display apparatus H2 according to the second modification. Like the first modification, the video display apparatus H2 has a construction in which a front cover 10 is foldable onto a base 11 with a liquid crystal monitor 12 received therebetween. A not-shown attachment to secure the base 11 on a dashboard or others is secured on the base 11.

Along both side walls of the base 11, guide grooves 16A and 16B are formed. Protrusions 18A and 18B secured on both lower corners of the liquid crystal monitor 12 come into engagement with the guide grooves 16A and 16B. A user grasps a holding end 13 or others of the front cover 10, and can open or close the front cover 10. In association with the open or close motion of the front cover 10, the protrusions 18A and 18B are smoothly slid along the guide grooves 16A and 16B about a pivot shaft 17.

In this video display apparatus H2, a not-shown stopping mechanism is secured closely to the pivot shaft 17, so that the liquid crystal monitor can be stopped at a prescribed angular position.

In the case that this video display apparatus H2 is opened by hand, the holding end 13 of the front cover 10 is grasped by fingertips and opened, as being pushed slightly, in a direction X in FIG. 6(b).

In association with a motion of the front cover 10, the liquid crystal 12 gradually gets up as it slides along the guide grooves 16A and 16B, as shown in a direction Y.

When the liquid crystal monitor 12 stands up to a prescribed angular position, a not-shown chuck device locks the monitor 12.

By contrast, for closing the front cover 10, the chuck device is released to fold the liquid crystal 12 between the front cover 10 and the base 11.

For applying the present invention to the video display apparatus H2 shown in FIGS. 7(a) to 7(c), the output of the signals are controlled as follows. That is, the pose signal Spz and under-exposure signal Scp are outputted from the microcomputer 3 during exposing the liquid crystal monitor 12 in a position shown in FIG. 7(c). In addition, the exposure completion signal Sop is outputted to start the output of the video signal Sav, when the liquid crystal monitor 12 has been unfolded up to a video displayable position.

In the video display apparatus H2 of the present modification, arranging electric motors or other necessary devices closely to the spindle 17 enables the video display apparatus to be opened or closed with electric power. In this case, the determination whether or not the synchronization signal Ssy is received within a prescribed period of time is made. If the determination of no reception is made, i.e., the display of video is completed, the video display apparatus H2 currently under its opened state is closed.

Referring to FIGS. 8(a) to 8(d), a video display apparatus H3 according to the third modification will now be described. In this apparatus H3, a front cover 10 and a base 11 are coupled with each other with the front cover 10 rotatable freely.

Figure 8A:
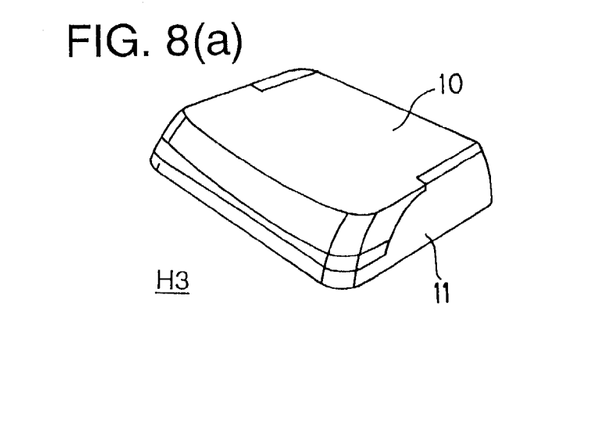
FIG. 8(a) is an external perspective view showing the inactive or folded state of a video display apparatus according to the third modification of the embodiment of the present invention.

An attachment 19 for securing the base 11 on a dashboard or others is attached to the base 11. The attachment 19 is secured on the dashboard using a double-coated adhesive tape 19A and/or screws 19B.

Along both inner side-walls of the base 11, guide grooves 16A and 16B are formed. Protrusions 18A and 18B secured on both lower corners of the front cover 10 come into engagement with the guide grooves 16A and 16B. A user grasps a holding end 13 or others of the front cover 10, and can open and close the front cover 10. In association with the open and close motions of the front cover 10, the protrusions 18A and 18B are smoothly slid along the guide grooves 16A and 16B.

In this video display apparatus H3, a not-shown stopping mechanism allows the liquid crystal monitor to be stopped at a prescribed angular position.

Figure 8B:
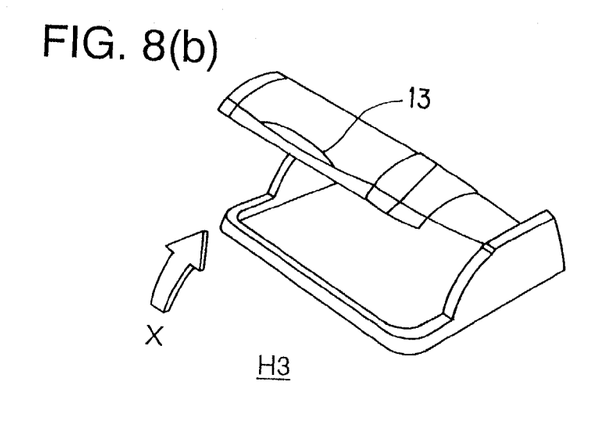
FIG. 8(b) shows an external perspective view showing the first intermediate state in the course of opening a front cover of the video display apparatus.

The holding end 13 of the front cover is grasped by fingertips and opened with a push in a direction X as the holding end is slightly moved forward.

Figure 8C:
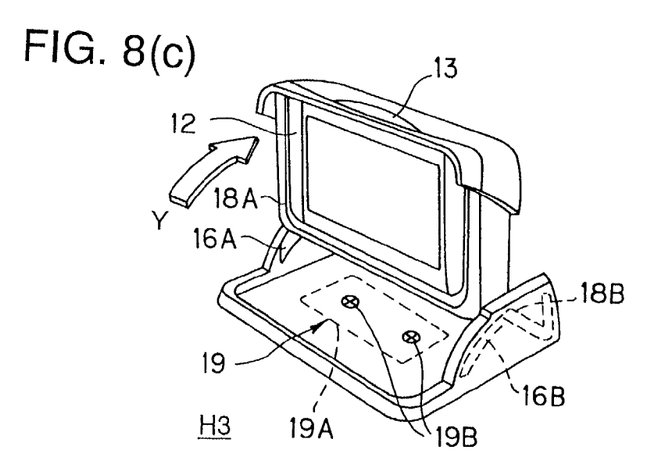
FIG. 8(c) shows an external perspective view showing the second intermediate state in the course of opening the front cover of the video display apparatus and FIG. 8(d) shows an external perspective view showing the active or opened state of the front cover of the video display apparatus.

The front cover 10 is then pushed down in a direction Y in such a manner that the protrusions 18A and 18B are smoothly slid forward along the guide grooves 16A and 16B.

Figure 8D:
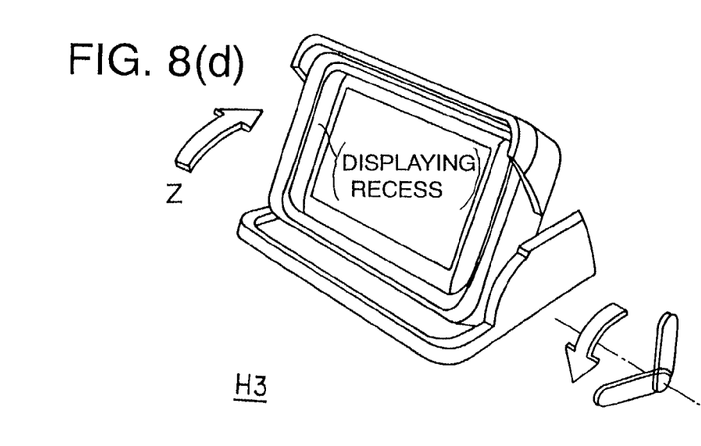

A further push of the front cover 10 in a direction Z permits the front cover 10 to turn up to a prescribed angular position. FIG. 8(d) exemplifies the pivot shaft and a rotation angle of the front cover 10.

By contrast, the front cover 10 can be closed through folding.

The video display apparatus H3 of the present modification can electrically be opened and closed by an electric motor. In this case, the determination whether or not the synchronization signal Ssy is received within a specified period of time is made. If the determination of no reception is made, i.e., the display of video is completed, the video display apparatus H3 currently under its opened state is closed.

For applying the present invention to the video display apparatus H3 shown in FIGS. 8(a) to 8(d), the output of the signals are controlled as follows. That is, the pose signal Spz and under-exposure signal Scp are outputted from the microcomputer 3 during placing the liquid crystal monitor 12 in a position shown in FIG. 8(d). In addition, the exposure completion signal Sop is outputted to start the output of the video signal Sav, when the liquid crystal monitor 12 has been extended up to a video displayable position.

Figure 9A:
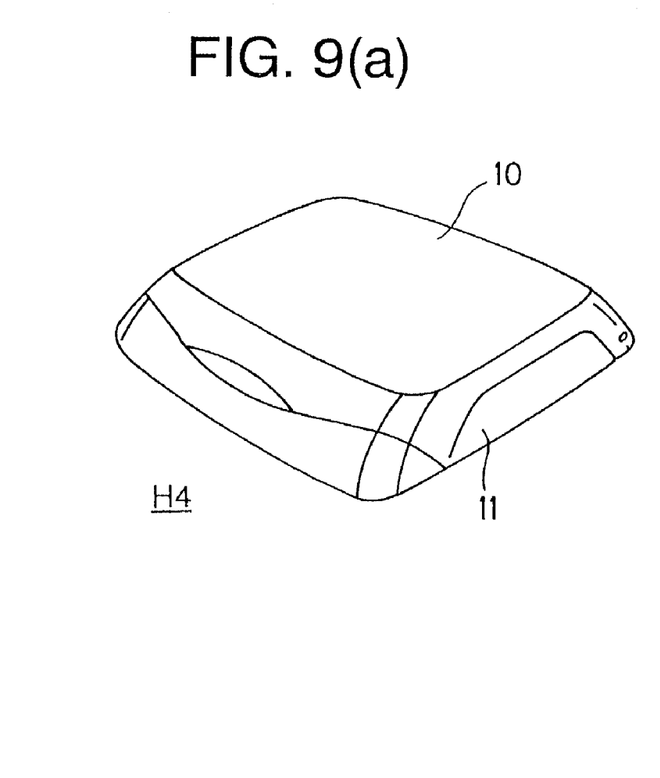
FIG. 9(a) is an external perspective view showing the inactive or closed state of a video display apparatus according to the fourth modification of the embodiment and FIG. 9(b) shows an external perspective view showing the active or opened state of a front cover of the video display apparatus.
Figure 9B:
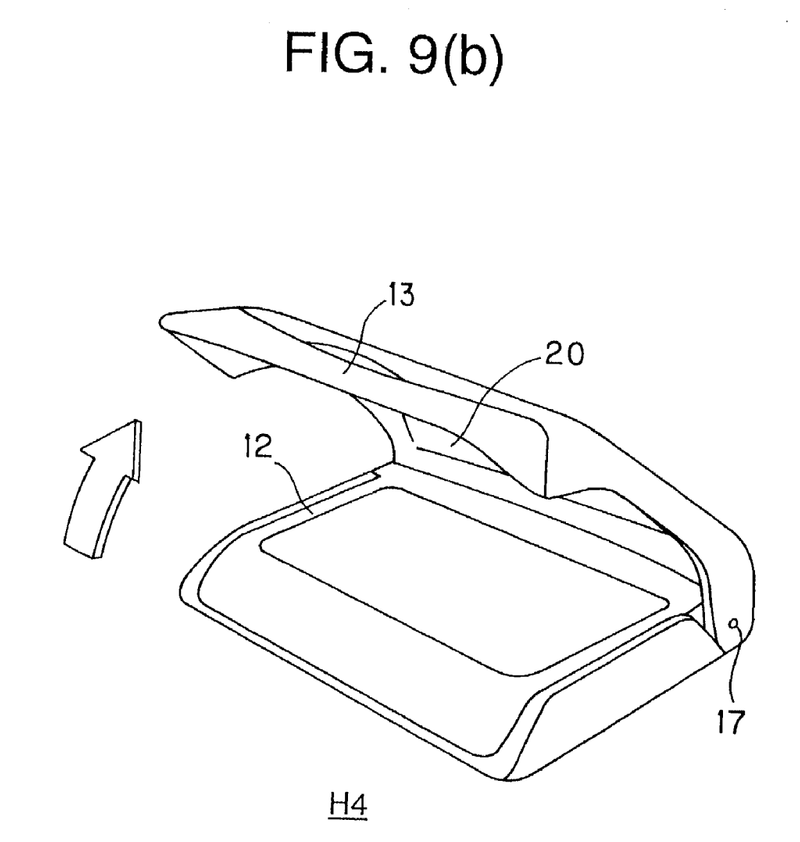

Referring to FIGS. 9(a) and 9(b), a video display apparatus H4 of the fourth modification will now be described. The video display apparatus H4 has a base 11 on which a liquid crystal monitor 12 is integrally formed together with a not-shown attachment for securing the base on a dashboard or others.

A reflecting mirror 20 is mounted on the inner surface of a front cover 10.

Further, the front cover 10 is rotatably coupled with the base 11 via a pivot shaft 17, providing a folding structure in which the front cover 10 can be smoothly turned upward or downward.

In the video display apparatus H4 of this modification, a not-shown stopping mechanism arranged closely to the pivot shaft 17 is used for stopping the front cover 10 at a prescribed angular position.

A user grasps the holding end 13 of the front cover 10 by fingertips and pulls it up so as to turn smoothly around the pivot shaft 17, thus the front cover 10 being lifted up.

Therefore, the front cover 10 is stopped by the stopping mechanism at a prescribed angular position.

After the stop, video of which right and left directions are reversed are displayed on the crystal liquid monitor 12. However, because the mirror 20 is attached on the inner surface of the front cover 10, the reversed image is reflected by the mirror 20 and is converted into a normal-direction image. Hence, the video can be observed.

Since movement of the front cover 10 changes a reflected direction of an image displayed by the liquid crystal monitor 12, an optimum observing position can be obtained.

The front cover 10, which is now opened, can be closed by hand or with an electrical power device.

This construction gives users an optimum angle of field of view for use, thus providing the video display apparatus H4 capable of securing safety and a forward view of uses for non-use.

For applying the present invention to the video display apparatus H4 shown in FIGS. 9(a) and 9(b), the output of the signals are controlled as follows. That is, the pose signal Spz and under-exposure signal Scp are outputted from the microcomputer 3 during placing the front cover 10 in a position shown in FIG. 9B. In addition, the exposure completion signal Sop is outputted to start the output of the video signal Sav, when the front cover 10 has been unfolded up to an angular position shown in FIG. 9B.

In cases the front cover 10 is electrically powered for its closing, it is determined if the synchronization signal Ssy has been received or not during a prescribed period of time. When there is no reception of such signal, i.e., the display of video is completed, the front cover 10 is closed.

The foregoing modifications can obtain the similar or identical advantages to those obtained in the foregoing embodiment.

Further, there is provided an alternative configuration for the microcomputer 3 and output controller 6. A personal computer can be used for the microcomputer 3 and output controller 6, as long as programs of the flowcharts shown in FIGS. 4 and 5 are stored in a flexible disc, a hard disc, or others serving as an information medium and the personal computer is able to read the programs for execution.

The entire disclosure of Japanese Patent Application No. 2000-242296 filed on Aug. 10, 2000 including the specification, claims, drawings and summary is incorporated herein by reference in its entirety.

What is claimed is:

1. A display control apparatus comprising:
    an opening device for placing a display device received in a receiving device in an active state thereof;
    a detection device for detecting whether or not the display device is placed in the active state; and
    an output device for outputting a video signal to be displayed on the display device to the display device to cause the display device to display video based on the video signal; and
    an operation device through which a command to display the video on the display device is given by an input operation,
    wherein:
    when the command is given by the input operation to display the video while the display device is being placed in the active state, the output device starts to output the video signal only after detection by the detection device that the display device has completely reached the active state.

2. The display control apparatus of claim 1, wherein the active state is a state at which the display device is placed so that the video displayed on the display device is visible.

3. A display control apparatus comprising:
    a display device received in a receiving device so as to be capable of being in any one of an inactive state in which the display device is retracted in the receiving device to make the display device invisible and an active state in which the display device is exposed from the receiving device to make the display device visible;
    a detection device for detecting whether or not display of all video to be displayed on the display device has actually been completed; and
    a receiving control device for retracting the display device in the receiving device so as to be placed in the inactive state from the active state, when it is detected that the display of all the video has actually been completed.

4. A display control method comprising the steps of:
    placing a display device received in a receiving device in an active state thereof;
    detecting whether or not the display device is placed in the active state; outputting a video signal to be displayed on the display device to the display device to cause the display device to display video based on the video signal; and
    giving a command to display the video on the display device;
    wherein:
    when the command is given to display the video while the display device is being placed in the active state, the outputting step starts to output the video signal only after detection that the display device has completely reached the active state.

5. The display control method of claim 4, wherein the active state is a state at which the display device is placed so that the video displayed on the display device is visible.

6. A display control method comprising the steps of:
    placing a display device in a receiving device so as to be capable of being in any one of an inactive state in which the display device is retracted in the receiving device to make the display device invisible and an active state in which the display device is exposed from the receiving device to make the display device visible;
    detecting whether or not display of all video to be displayed on the display device has actually been completed under active state; and
    retracting the display device in the receiving device so as to be placed in the inactive state from the active state, when it is detected that the display of all video has actually been completed.

7. An information recording medium in which a display control program is recorded readably by a computer included in a display control apparatus, the display control program causing the computer to serve as:
    an opening device for placing a display device received in a receiving device in an active state;
    a detection device for detecting whether or not the display device is placed in the active state;
    an output device for outputting a video signal to be displayed on the display device to the display device to cause the display device to display video based on the video signal; and
    an operation device through which a command to display the video on the display device is given by an input operation,
    wherein:
    when the command is given by the input operation to display the video while the display device is being placed in the active state, the output device starts to output the video signal only after detection by the detection device that the display device has completely reached the active state.

8. The information recording medium of claim 7, wherein the active state is a state at which the display device is placed so that the video displayed on the display device is visible.

9. An information recording medium in which a display control program is recorded readably by a computer included in a display control apparatus, the display control program causing the computer to serve as:
    a detection device for detecting whether or not display of all video to be displayed on a display device has actually been completed under an active state in which the display device is exposed from a receiving device to make the display device visible; and
    a receiving control device for retracting the display device in the receiving device so as to be placed in an inactive state in which the display device is retracted in the receiving device to make the display device invisible, from the active state, when it is detected that the display of all video has actually been completed.

* * * * *